Feb. 5, 1935. F. McFADDEN 1,990,297
LENS INDICATING APPARATUS
Filed June 22, 1933 2 Sheets-Sheet 2
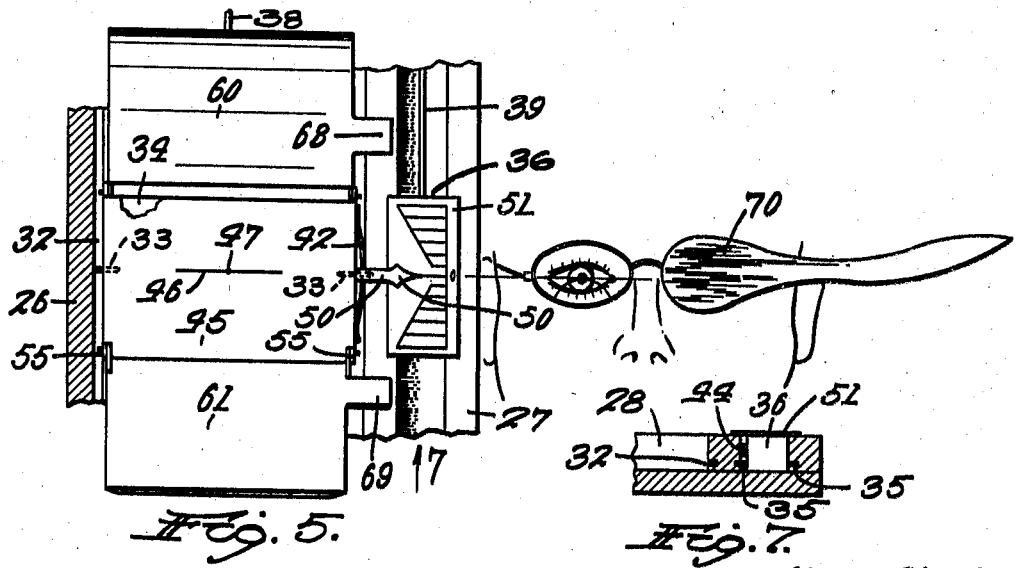
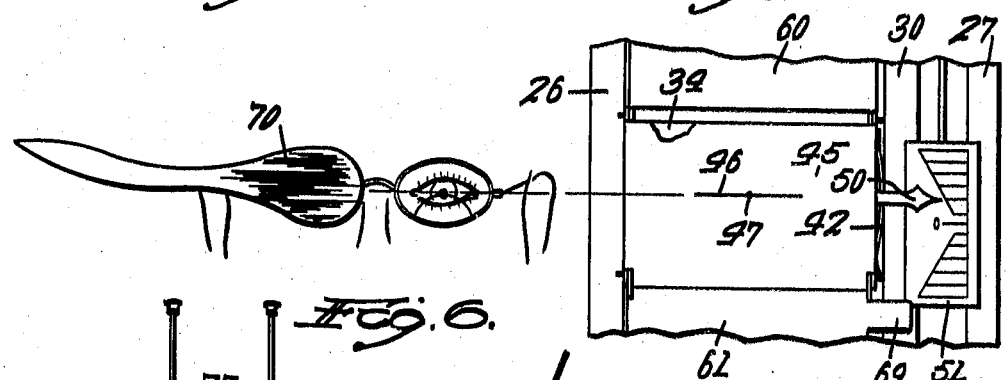
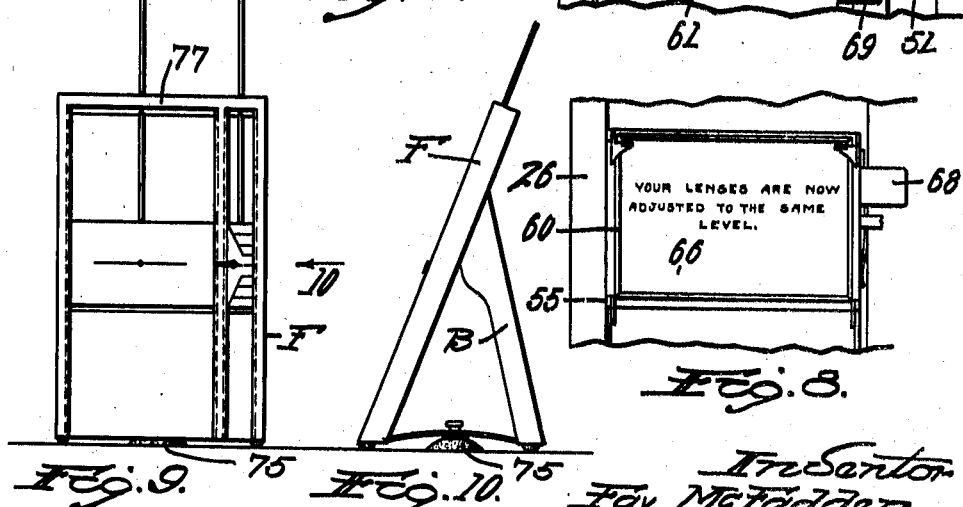

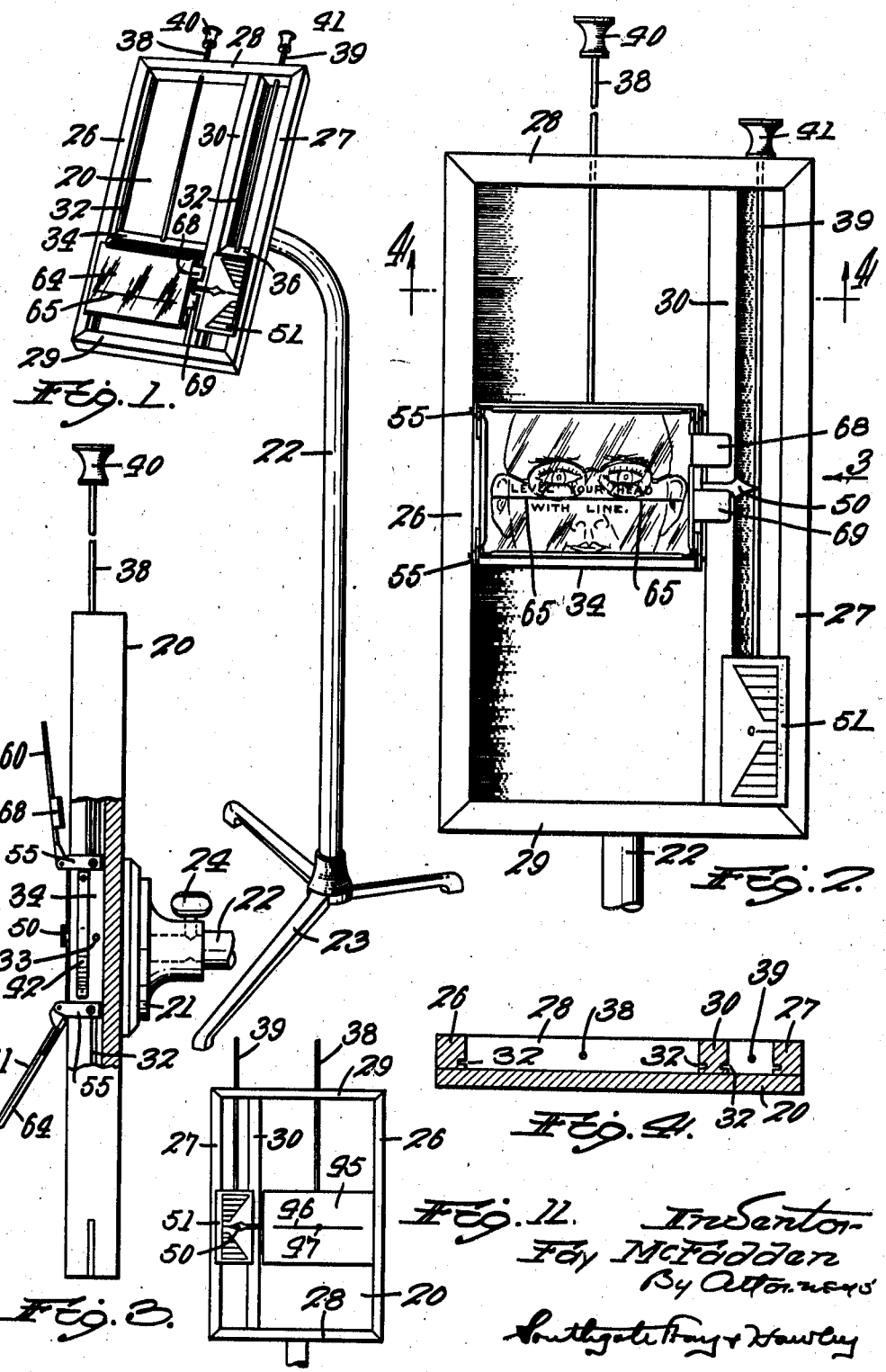

Patented Feb. 5, 1935

1,990,297

UNITED STATES PATENT OFFICE 1,990,297

LENS INDICATING APPARATUS

Fay McFadden, Rutland, Vt.

Application June 22, 1933, Serial No. 677,017

8 Claims. (Cl. 88—20)

This invention relates to apparatus designed for use by optometrists and others in relatively adjusting or leveling the lenses of glasses or spectacles.

While capable of general use, the invention is particularly designed for the adjustment of bifocal lenses in which the division line between the near vision and far vision portions is not easily perceptible.

Bifocal lenses should be so adjusted and positioned before the wearer's eyes that when the vision changes from distant perception in the upper portion to close or reading perception in the lower portion, both eyes should pass the division line between the upper and the lower portions simultaneously.

If the right and left eyes do not pass this line of division between the lens portions simultaneously, there is a sensation of confusion, largely because of the prismatic value in all lenses which tends to slightly displace the apparent position of an object. If one eye senses an object in one position while the other eye simultaneously senses the object in a slightly higher or lower position, confusion naturally results.

For these reasons, it is very important that the right and left lenses be relatively adjusted or leveled to such positions that the passing of perception from near vision to far vision or from far vision to near vision will take place simultaneously for both eyes of the wearer.

This adjustment has heretofore commonly been attempted only by a crude "cut and try" method, which consumed much time and was frequently inaccurate and unsatisfactory in results.

It is the general object of my present invention to provide an indicating apparatus by which the relative adjustment and position of two lenses may be accurately indicated, and by the use of which exact leveling and adjustment may be easily and rapidly accomplished.

To the attainment of this object, my invention in the preferred form is embodied in a simple and easily operated apparatus by which comparative tests of the relative positions of two associated lenses may be easily and accurately made.

My invention further relates to arrangements and combinations of parts which will be hereinafter described and more particularly pointed out in the appended claims.

Preferred forms of the invention are shown in the drawings, in which

Fig. 1 is a perspective view of my improved lens indicating apparatus;

Fig. 2 is an enlarged front elevation of the apparatus;

Fig. 3 is a side elevation, partly in section, looking in the direction of the arrow 3 in Fig. 2;

Fig. 4 is a sectional end elevation, taken along the line 4—4 in Fig. 2;

Fig. 5 is a front elevation showing the apparatus as used for indicating the right lens;

Fig. 6 is a similar view showing the apparatus as used for indicating the left lens;

Fig. 7 is a detail sectional view, looking in the direction of the arrow 7 in Fig. 5;

Fig. 8 is a partial front elevation, indicating the final step in the use of the apparatus;

Fig. 9 is a front elevation of a desk or table type of apparatus;

Fig. 10 is a side elevation thereof, looking in the direction of the arrow 10 in Fig. 9, and Fig. 11 is a front elevation showing the reversibility of certain parts.

Referring to the drawings, my improved apparatus comprises a back 20 provided with a boss 21 (Fig. 3) having an opening to receive the upper end of a post 22 (Fig. 1) extending upward from a floor stand 23. The boss 21 may be secured on the post 23 in any convenient manner as by a thumb screw 24 (Fig. 3).

The back 20 is provided with side members 26 and 27, a top member 28, a bottom member 29 and a partition member 30. The side members 26 and 27 and the partition member 30 are provided with longitudinal grooves 32 (Fig. 4) on their inner faces, forming guideways for guide-pins 33 (Fig. 2) in the ends of a block 34 and for corresponding guide-pins 35 (Fig. 7) in a slide 36.

Rods 38 and 39 are screwed into the block 34 and slide 36 respectively and are provided with knobs 40 and 41 by which the block and slide may be moved along the guideways 32.

A leaf spring 42 (Fig. 3) at one end of the block 34 engages an inner face of the rib 30, thus providing sufficient friction to hold the block yieldingly from accidental displacement after adjustment. A similar leaf spring 44 (Fig. 7) is provided for the same purpose on the slide 36.

The block 34 is provided with a surface or coating 45 having a horizontal indicating line 46 thereon, the middle of the line being preferably indicated by a dot 47. The coating 45 may be applied directly to the block 34 or may comprise a card or layer of suitable material secured thereto. An index or pointer 50 is mounted on the block 34 and projects at one side thereof over a plate 51 on the slide 36, which plate 51 is provided with a zero line and with a series of graduations at each side thereof, as clearly shown in Fig. 5.

Small plates 55 (Fig. 3) are fixed to the corners of the sliding block 34 and project above the outer surface thereof to provide pivotal support for top and bottom covers 60 and 61, which covers are adapted to be folded inward over the surface 45 when the apparatus is not in use.

The outer face of the bottom 61 is preferably provided with a mirror 64 (Figs. 1 and 2) having a horizontal line 65 thereon. The outer face of the top cover 60 may be provided with a printed card 66 (Fig. 8) bearing any suitable legend. Lugs 68 and 69 (Fig. 2) are provided at the ends of the covers 60 and 61 for convenient manipulation thereof.

Having described the details of construction of one form of my improved apparatus, I will now describe the method of using the same in adjusting bifocal lenses. The covers 60 and 61 are first moved to bring the bottom cover outside, as indicated in Figs. 1 and 2, and the wearer of the lenses to be adjusted is then asked to level his head with respect to the horizontal line 65, a legend to this effect preferably appearing on the mirror 64.

The wearer of the lenses is then instructed to maintain his head as nearly stationary as possible during the adjusting of the lenses. Any suitable support or steady-rest may be provided to assist the wearer in thus maintaining his head in the same position.

The covers 60 and 61 are then swung open to disclose the surface 45 and line 46, and a device 70 is held in front of one of the wearer's eyes, which in Fig. 5 is indicated as the left eye. The wearer is then directed to look through the right eye at the line 46.

The block 34 is moved upward and downward by the operator by use of the knob 40 and rod 38 until two associated lines 46 appear in the vision. This indicates that the wearer is viewing the line 46 through the adjacent edges of the upper and lower portions of the right bifocal. The block is closely adjusted until the upper and lower visions of the line 46 are equally distinct, and the slide 36 is then moved upward or downward to bring the zero line opposite the index 50.

The right eye is then covered by the device 70, as indicated in Fig. 6, and the block 34 is again moved upward or downward until the wearer apparently sees two lines 46 with equal clearness. The new position of the index 50 with reference to the zero line on the plate 51 is then noted, and if the lenses are correctly adjusted and leveled with respect to each other, the index will be found to point to the zero line.

If, however, the index points to a graduation above the zero line, as shown in Fig. 6, it indicates that the left lens is too high and should be lowered, or conversely that the right lens is too low and should be raised. If the index points to a graduation below the zero line, a reverse adjustment is required.

After thus relatively adjusting the lenses, the indicating operation is repeated, and after very few trials the lenses will be found to indicate the zero mark for both lenses, showing that the lenses are properly leveled. When this is accomplished, the upper cover 60 may be swung downward, bringing the legend on the card 66 in view, and the wearer of the lenses may then test his vision by the clearness with which the legend is read.

In certain office spaces it may be found more desirable to read the graduations at the left rather than at the right of the apparatus, in which case the back 20 may be reversed in position on the post 22 by loosening the screw 24, and the rods 38 and 39 may be removed from one edge of the block 34 and slide 36 and may be inserted in the opposite edge as indicated in Fig. 11.

In Figs. 9 and 10 I have indicated a somewhat simpler form of the apparatus in which a frame F is provided with a brace B and with a suction cup 75 by which the device may be temporarily secured to the top of the table or desk. The covers 60 and 61 are not shown in this simplified construction but may obviously be added thereto if so desired. Furthermore, only one end member 77 is shown for the frame F, reversal of the apparatus not being provided, and the sliding parts are insertable from the bottom.

In the construction previously described, one of the end members 28 or 29 (Fig. 2) is made removable for insertion of the block 34 and slide 36.

The operation of the device shown in Figs. 9 and 10 is similar to that of the construction previously described, except that preliminary leveling of the head by the mirror 64 and final testing of the vision by the reading card 66 is omitted.

While I have shown the index on the larger block 34 and the graduated scale on the smaller slide 36, reversal of these elements is obviously within the scope of my invention.

Having thus described my invention and the advantages thereof, I do not wish to be limited to the details herein disclosed, otherwise than as set forth in the claims, but what I claim is:—

1. A lens indicating apparatus comprising a support, a member manually slidable vertically thereon and having a test line, a second member, means to guide said two members for movement in adjacent parallel paths, and means to maintain each member in vertically adjusted position, one of said members having an index thereon and the other member having a cooperating index line.

2. A lens indicating apparatus comprising a support, a member manually slidable vertically thereon and having a test line, a second member, means to guide said two members for movement in adjacent parallel paths, and means to maintain each member in vertically adjusted position, one of said members having an index thereon and the other member having a cooperating index line and associated graduations.

3. A lens indicating apparatus comprising a support having two sets of parallel and substantially vertical guideways therein, a block slidable in one set of said guideways, a slide for the other set of guideways, separate means to move said block and slide in said guideways, said block having a horizontal test line thereon and said block and slide having a cooperating index and index line thereon.

4. A lens indicating apparatus comprising a support having two sets of parallel and substantially vertical guideways therein, a block slidable in one set of said guideways, a slide for the other set of guideways, separate means to move said block and slide in said guideways, said block having a horizontal test line thereon and said block and slide having a cooperating index and index line thereon, and means to prevent accidental displacement of either the block or the slide after adjustment thereof.

5. A lens indicating apparatus comprising a support, a member manually slidable vertically thereon and having a test line, a second member, means to guide said two members for movement in adjacent parallel paths, and means to maintain each member in vertically adjusted position, one of said members having an index thereon and the other member having a cooperating index line, said first member having a cover movable to a position to conceal said test line and said cover having a reflecting outer surface provided with an indication by which the wearer of the lens to be leveled may align his head with said apparatus.

6. A lens indicating apparatus comprising a support, a member manually slidable vertically thereon and having a test line, a second member, means to guide said two members for movement in adjacent parallel paths, and means to maintain each member in vertically adjusted position, one of said members having an index thereon and the other member having a cooperating index line, said first member having a cover movable to a position to conceal said test line and said cover having a reflecting outer surface provided with an indication by which the wearer of the lens to be leveled may align his head with said apparatus, and said first member having a second cover movable to conceal said test line and provided with a legend on its outer surface, by the facility of reading whereof the adjustment of the lenses may be checked.

7. A lens indicating apparatus comprising a support having two sets of parallel and substantially vertical guideways therein, a block slidable in one set of said guideways, a slide for the other set of guideways, means to move said block and slide in said guideways, said block having a horizontal test line thereon and said block and slide having a cooperating index and index line thereon, means to prevent accidental displacement of either the block or slide after adjustment thereof, and a stand on which said support is mounted and relative to which said support may be inverted, the moving means for said block and slide being operable in either of two reversed positions of said means relative to said support.

8. An apparatus for indicating the relative adjustment of bifocal lenses which comprises a support, a member bearing a horizontal test line and having an index on said member, means to raise and lower said member on said support to bring said test line to a position in which said line appears double through a bifocal lens, and a device having a graduated scale and an initial datum line, said device being manually movable on said support to bring said datum line to coincidence with said index on said member, and means to prevent accidental displacement of said device, whereby a direct scale reading of the relative displacement of said member, when adjusted to a different position for a second lens, may be obtained.

FAY McFADDEN.